Jan. 13, 1970  G. R. BLEVINS  3,489,191
COUPLING CONSTRUCTION AND SUPPORT
Filed Aug. 29, 1967  2 Sheets-Sheet 1
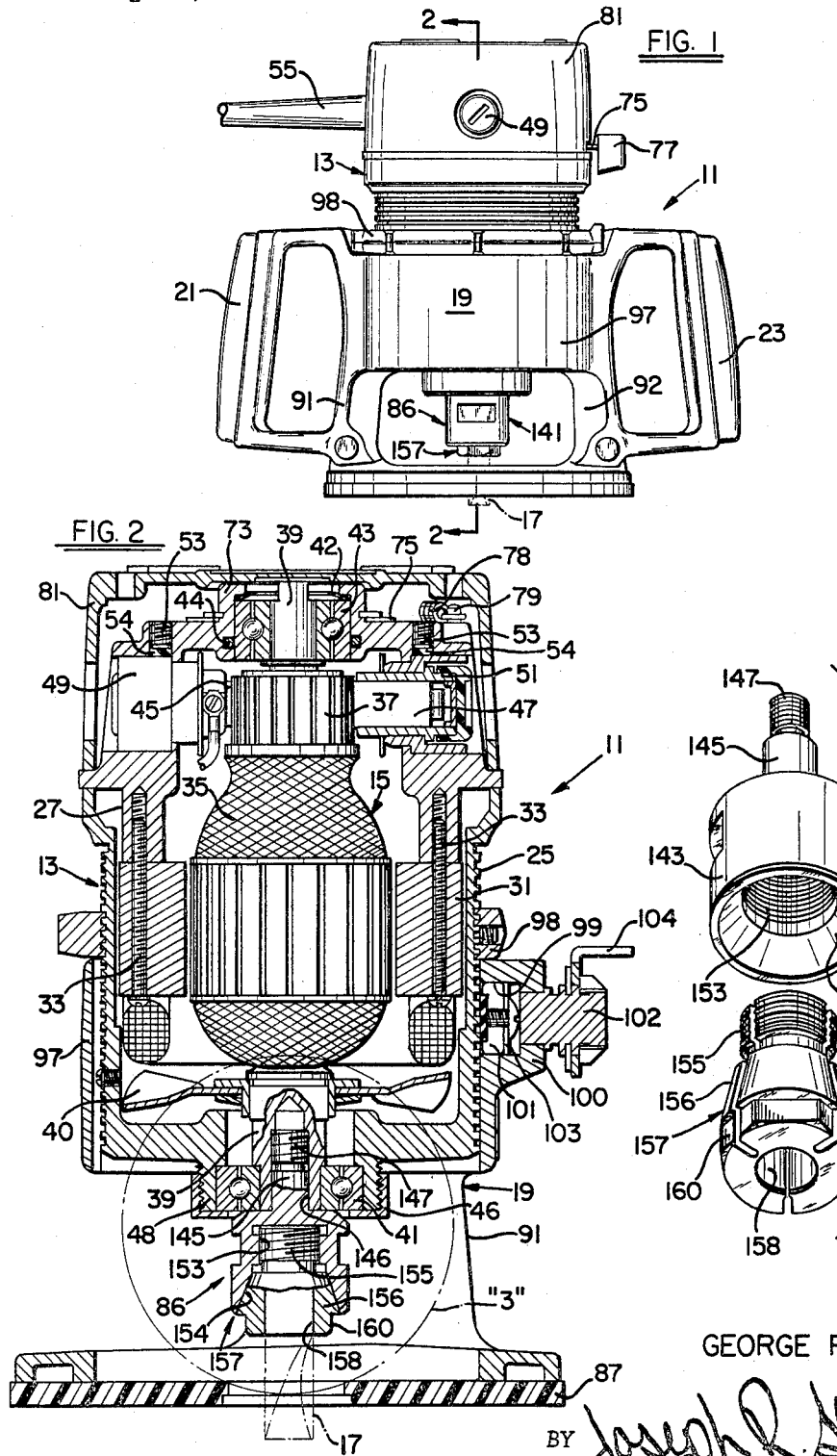
INVENTOR
GEORGE R. BLEVINS
BY Joseph R. Gotnik
ATTORNEY Jan. 13, 1970    G. R. BLEVINS    3,489,191
COUPLING CONSTRUCTION AND SUPPORT
Filed Aug. 29, 1967    2 Sheets-Sheet 2

INVENTOR
GEORGE R. BLEVINS
BY Joseph R. Slotnik
ATTORNEY

United States Patent Office 3,489,191
Patented Jan. 13, 1970

3,489,191
COUPLING CONSTRUCTION AND SUPPORT
George R. Blevins, Baltimore, Md., assignor to The Black and Decker Manufacturing Company, Towson, Md., a corporation of Maryland
Filed Aug. 29, 1967, Ser. No. 664,160
Int. Cl. B27c 5/10; B23b 5/22
U.S. Cl. 144—134
3 Claims

ABSTRACT OF THE DISCLOSURE

The device disclosed herein is a portable router and comprises an electric motor encased within a composite housing with a motor shaft connected by a coupling to a tool bit coaxial therewith. The motor housing is supported by a base adapted to rest upon and slidably move over a work surface. The base is adjustably secured to the motor housing to selectively position the height of the motor housing relative to the work surface and adjust the depth of cut of the tool bit.

BRIEF SUMMARY OF THE INVENTION

The present invention relates to an improved coupling construction for coaxially interconnecting a relatively large tool bit to a driven shaft in rotary tools such as, for example, routers, which construction is rugged and compact, provides for accurate tool bit rotation and effectively minimizes tool bit run-out and lateral deflection during use. The coupling construction of the present invention includes a collet adaptor having a reduced end secured to and piloted within the end of the shaft which, in turn, is journaled within a bearing carried by a housing. A tool bit is secured within an enlarged, socket-like portion at the other end of the collet adaptor. Since tool bit run-out, resulting from canting of the tool bit axis relative to the shaft due to manufacturing tolerances, and lateral deflection of the tool bit, under loaded conditions, are both functions of the distance from the tool bit end to the shaft bearing, by securing and piloting the collet adaptor within the shaft this distance is minimized as is tool bit run-out and lateral deflection, and, advantageously the overall axial dimension of the coupling construction is minimized as well.

Main objects, therefore, of the present invention are to provide an improved coupling construction for interconnecting a relatively large diameter tool bit to a standard sized shaft which construction pilots the tool bit for accurate rotation and rigidly supports the bit for minimal lateral deflection during use.

Additional important objects of the present invention are to provide an improved coupling construction of the above character which is axially compact, relatively inexpensive to manufacture, rugged in construction and reliable in use.

Other objects and advantages of the present invention will become more apparent from a consideration of the detailed description to follow, taken in conjunction with the appended drawings.

BRIEF DESCRIPTION OF THE DRAWINGS

FIG. 1 is an elevational view of a router embodying the present invention;

FIG. 2 is an enlarged vertical sectional view of FIG. 1 taken substantially along the line 2—2 thereof;

FIG. 4 is an exploded prospective view of a collet and collet adaptor constructed according to the present invention.

BROAD STATEMENT OF THE INVENTION

Figure 3:
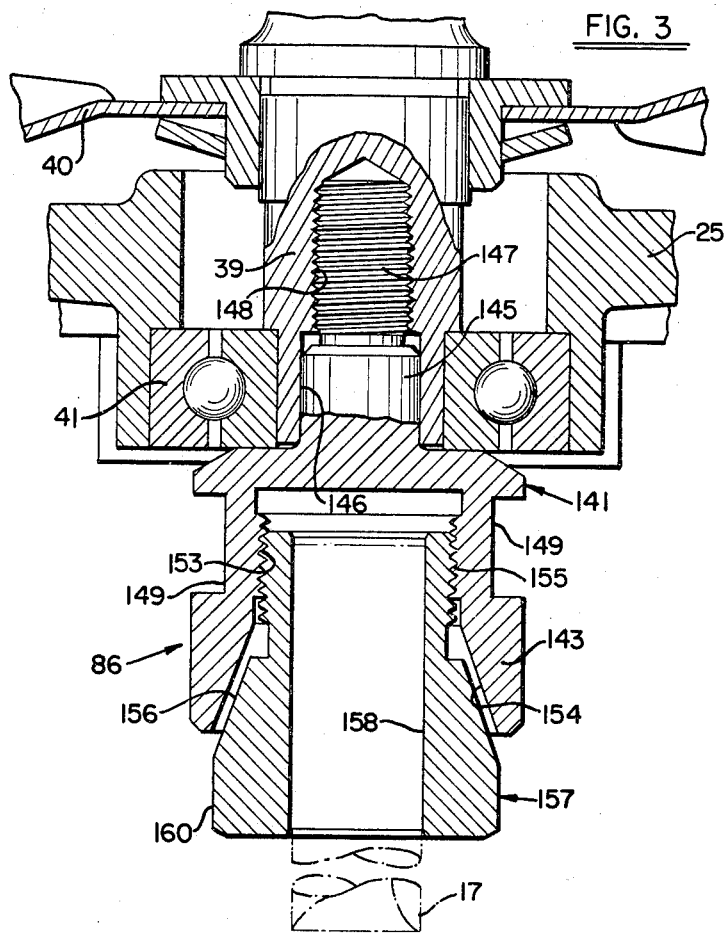
FIG. 3 is an enlarged view of a portion of FIG. 2 taken within the enclosure "3;"

Broadly described, the present invention relates to a powered tool comprising a housing, a motor within said housing and including a motor shaft, a pair of bearings within said housing and supporting said shaft at opposite ends thereof, said shaft having an opening in one end thereof and defining an inboard threaded portion and an outboard piloting portion, coupling means including an adapter having an outer, enlarged portion and an inner reduced portion separated by a shoulder, said outer adaptor portion being threaded to receive a collet-type chuck, said inner adaptor portion being threaded into said shaft inboard portion and piloted in said shaft outboard portion, said adaptor shoulder being seated against the bearing supporting said shaft one end.

DETAILED DESCRIPTION

Referring now more particularly to the drawings, an electric powered router embodying the present invention is illustrated generally at 11 in FIGS. 1 and 2, although it is to be understood that the invention finds use in the general class of rotable power tools, electric, pneumatic or otherwise. With this in mind, the router 11 is seen to include a housing 13 having an electric motor 15 supported therein and drivingly coupled to a tool bit 17. The housing 13 is adustably supported by a base 19 adapted to rest upon a work surface and handles 21, 23, are provided on the base 19 for control and manipulation of the router 11.

The housing 13, as shown in FIG. 2, includes a motor housing 25 and a bearing housing 27 secured together by screws (not shown) extending axially of the motor 15. The motor 15 includes a stationary field 31 located within the motor housing 25 and secured to the bearing housing 27 by axial screws 33. An armature windings assembly 35 is disposed within the field 31 and is rotatable conjointly with a commutator 37, and an armature or motor shaft 39 upon which the armature windings assembly and commutator are fixed. A pair of bearings 41, 43 are carried by the motor housing 25 and the bearing housing 27, respectively, and rotatably support the shaft 39 at opposite ends thereof. Preferably, a spring washer 42 engages the outer race of the bearing 43 to take up tolerances in the parts and preloads the bearing. An O-ring 44 carried by the bearing housing 27 also engages the outer race of bearing 43 to prevent it from turning and therefore reduces wear thereof. A nut 46 is threaded on a reduced end 48 of the bearing housing 27 to hold the bearing 41 in place. A fan 40 is pressed on the motor shaft 39 to rotate therewith and draws cooling air through the motor 15 during use.

A pair of electric brushes 45, 47 are carried by brush holders 49, 51, respectively, which are fixed in pockets in the bearing housing 27 by set screws 53 and are kept from vibrating loose by nylon pins 54, and the brushes are spring biased into engagement with the commutator 37 as is customary. A line cord 55 depends from the housing 13 and carries power leads which are connected, in the usual manner, to the brushes 45, 47, and motor field 31 through an on-off switch (now shown) which may be fixed upon the bearing housing 27. The switch (not shown) is controllably actuated by a switch lever 75 pivotally fitted over a cylindrical boss 73 on the end of the bearing housing 27. The switch lever 75 is bent to a generally S-shaped configuration and has a manually manipulable finger knob 77 fixed to its outer end. Thus, when the line cord 55 is connected to a suitable electric source and the knob 77 moved sideways to pivot the switch lever 75 and close the switch (not shown), the motor 15 is energized. A tension spring 78 has one end secured to the switch lever 75 and the other end to a pin 79 on the bearing housing 27 to assist in returning the switch lever 75 to its original position and the switch (not shown) to the off position. An end cap 81 is positioned over the bearing housing 27 and is secured thereto by screws (not shown) to protect the motor components and controls and trap the line cord 55 in place.

The armature shaft 39 is secured by a novel coupling means 86 to the tool bit 17 so that the latter rotates with the shaft 39. The housing 13 and therefore the tool bit 17 is adjustably supported relative to a work surface by the base 19 which has a work surface engaging sub base 87 suitably secured thereto so that by adjusting the housing 13 vertically relative to the base 19, the depth of cut of the tool bit 17 is adjusted. The base 19 includes integral upstanding base legs 91, 92 and a tubular sleeve 97 which loosely surrounds the motor housing 25 (see FIGS. 1 and 2). An adjusting collar 98 is threaded on the motor housing 25 and is adapted to rest atop the sleeve 97 to support the housing 13 in vertically adjusted positions relative to the base 19 and the tool bit 17 in vertically adjusted positions relative to the work surface. A boss 100 on the base sleeve 97 has an internal recess or pocket 99 in which a locking shoe 101 is disposed (FIG. 2). A screw 102 is threaded into the boss 100 behind the shoe 101 so that when threaded into the pocket 99, the screw 102 presses the shoe 101 into engagement with the motor housing 25 and locks the housing 13 in place within the tubular base sleeve 97. When the screw 102 is withdrawn, a leaf-type spring 103 retracts the shoe 101 and the housing 13 may be adjusted vertically by turning the adjusting collar 98. The screw 102 may have a thumb lever 104 fixed thereto or integral therewith for easy turning thereof.

In rotary power tools of this type, the coupling means interconnecting the armature shaft and the tool bit usually includes a collet or the like which receives the tool bit and which is keyed or otherwise secured to the armature shaft for conjoint rotation therewith. To achieve satisfactory performance characteristics and maintain concentric tool bit rotation in these tools, it is necessary to pilot this coupling means into the armature shaft or the shaft supporting bearing. Smaller sized tool bits are carried by a collet which, in turn, is piloted directly into and secured for conjoint rotation with the armature shaft. Larger tool bits, however, require a larger collet. This, in turn, would require a larger armature shaft and, therefore, larger bearings and a larger housing. From a size, weight and cost standpoint, this is not desirable so that it becomes important to provide a coupling construction which avoids using an unduly large diameter armature shaft.

Figure 3A:
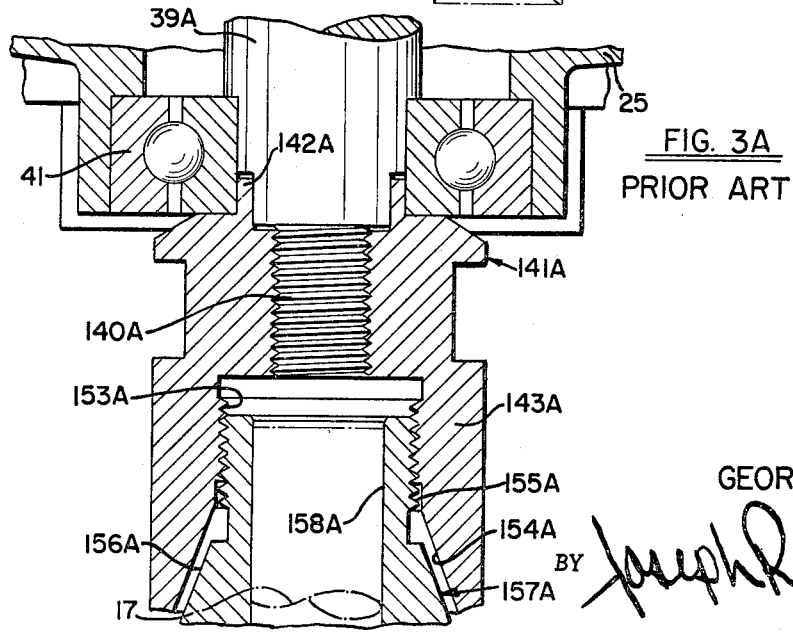
FIG. 3A is a view, similar to FIG. 3, illustrating a typical "prior art" construction.

Thus, in many cases, a collet adaptor has been employed which interconnects the armature shaft and the collet. One relatively successful construction embodies a collet adaptor which is piloted into the armature shaft supporting bearing and is coupled to a portion of the armature shaft which is outboard of the bearing. A construction of this type is illustrated in FIG. 3A. As shown there, the motor shaft 39A has a reduced outer end 140A which extends beyond or outboard of the bearing 41. A collet adaptor 141A is threaded on the shaft end 140A for conjoint rotation therewith and has a projecting, annular sleeve portion 142A piloted in the bearing 41.

The collet adaptor 141A has a socket-like outer portion 143A provided with a threaded bore 153A and an outer, conical counterbore 154A. A collet 157A has a central bore 158A, adapted to receive the shank of the tool bit 17, and a threaded end 155A and a conical portion 156A adapted to be received in the adaptor portion 153A, 154A, respectively. When the conical portions 154A and 156A are drawn up tight, the tool bit 17 is secured in position within the collet 157A.

It will be appreciated that tool bit run-out, which results from canting of the tool bit axis relative to the armature shaft axis due to manufacturing tolerances in the parts, and lateral tool bit deflection, caused by laterally directed forces thereon during use, are functions of the axial distance from the motor shaft bearing 41 to the tool bit outer end, on the point where these forces are acting. High performance characteristics, including accuracy, long tool life, etc., dictate that tool deflection be minimized so that it becomes correspondingly important to minimize the distance from the bearing 41 to the working end of the tool bit 17.

To this end, the present invention embodies a novel coupling construction whereby concentric bit rotation is insured and the unsupported length from shaft bearing 41 to bit end is minimized. Thus, as seen in FIGS. 2–4, a collet adaptor 141, constructed according to the present invention, has a socket-like outer portion 143 and a reduced, intermediate portion 145 piloted into a bore 146 formed in the armature or motor shaft 39 in radial alignment with the bearing 41. The adaptor 141 has a terminal threaded portion 147 received in a threaded opening 148 aligned with the bore 146 and inwardly thereof and inboard of the bearing 41 to secure the adaptor 141 and shaft 39 for conjoint rotation. By "inboard of the bearing" is meant not outboard thereof, that is, not extending axially beyond the outermost point on the bearing 41 relative to the housing 25. The shaft bore 146 is accurately machined relative to the outer, journaled shaft surface to insure concentric rotation of the collet 141.

The socket-like, adaptor outer portion 143 has an inner, threaded bore 153 and an outer conical counterbore 154 adapted to receive a threaded end 155 and a conical portion 156 of a collet 157. The collet 157 has a central bore 158 in which a tool bit shank 159 is received and when threaded into seated relation with the adaptor counterbore 154, secures the tool bit 17 in position therein. The outer end of the collet 157 has flats 160 for use of a wrench to tighten and loosen the collet 157. Flats 149 on the outer surface of the adaptor portion 143 permit ready insertion and removal thereof, relative to the armature shaft 59.

It will be appreciated that by coupling the adaptor 141 to the armature shaft 39 inboard of the bearing 41, as distinguished from the outboard interconnection described above and shown in FIG. 3A, together with piloting the adaptor 141 into the armature shaft 39 in substantial, radial alignment with the bearing 41, the distance from the bearing 41 to the working portion of the tool bit 17 is minimized. This, in turn, provides for maximum tool bit support and minimum run-out and deflection thereof during use thereby providing optimum operating characteristics of the device.

It will be appreciated that the collet adaptor 141 of the present invention is constructed for use with a variety of relatively large sized tool bits. Thus, a variety of collets 149, having different sized bores 158 to receive correspondingly sized tool bits, may be constructed to fit into one adaptor 141.

By the foregoing, there has been disclosed an improved motor shaft and tool bit coupling calculated to fulfill the inventive objects hereinabove set forth, and while a preferred embodiment of the present invention has been illusrtated and described in detail, various additions, substitutions, modifications and omissions may be made thereto without departing from the spirit of the invention as encompassed by the appended claims.

I claim:

1. A powered tool comprising a housing, a motor within said housing and including a motor shaft, a pair of bearings within said housing and supporting said shaft at opposite ends thereof, said shaft having an opening in one end thereof and defining an inboard threaded portion and an outboard piloting portion, coupling means including an adapter having an outer, enlarged portion and an inner reduced portion separated by a shoulder, said outer adaptor portion being threaded to receive a collet-type chuck, said inner adaptor portion being threaded into said shaft inboard portion and piloted in said shaft outboard portion, said adaptor shoulder being seated against the bearing supporting said shaft one end.

2. A construction as defined in claim 1 wherein said chuck has a conically tapered portion received in a complementary shaped tapered portion in said adaptor.

3. A construction as defined in claim 1 wherein said adaptor reduced portion is piloted within said shaft opening at a position generally radially aligned with said bearing.

References Cited

UNITED STATES PATENTS

| | | | |
|---|---|---|---|
| 1,406,006 | 2/1922 | Hanson. | |
| 2,198,921 | 4/1940 | Shaff | 279—99 X |
| 2,330,686 | 9/1943 | Cornell et al. | 279—99 X |
| 2,842,173 | 7/1958 | Turner | 144—136 |
| 2,952,281 | 9/1960 | Weber | 144—134 |

DONALD R. SCHRAN, Primary Examiner

U.S. Cl. X.R.

144—70; 279—99